United States Patent Office 2,850,481
Patented Sept. 2, 1958

2,850,481

DIHYDROXYALKYL ALKENYLARYL ETHERS AND POLYMERS THEREFROM

Gaetano F. D'Alelio, Pittsburgh, Pa., assignor to Koppers Company, Inc., a corporation of Delaware No Drawing. Application October 20, 1954
Serial No. 463,612

30 Claims. (Cl. 260—47)

This invention is concerned with certain new dihydroxyalkyl alkenaryl ethers. It is concerned with these substances in a monomeric as well as polymeric form. Furthermore, the invention is concerned with insoluble or "cured" polymers which can be obtained by treating dihydroxyalkyl alkenaryl ether polymers to cause crosslinking.

The invention is particularly concerned with dihydroxyalkyl alkenaryl ethers of the formula

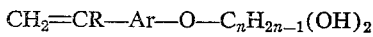

in which Ar is an arylene radical, R is chosen from the class consisting of hydrogen and methyl, and $n$ is an integer having a value no greater than 8.

In particular the invention is concerned with dihydroxyalkyl vinyl- and isopropenyl- aryl ethers. It will be realized that polymers of the monomers of this invention contain dihydroxyalkyl groups. These polymers are useful in many polymer applications such as for molding, coatings, laminating and adhesives by, for example, esterification with drying oil fatty acids for paints, reaction with polyisocyanaes or polyoxiranes and the like.

As used herein the term "polymer" embraces both homopolymers and copolymers. The term "copolymers" as used herein embraces polymeric materials derived from the polymerization of two or more monomeric materials. That is, 2,3,4,5 . . . ad infinitum copolymerizable monomeric substances can be copolymerized to produce "a copolymer." As used herein the terms "parts" and "percentages" indicate parts and percentages by weight unless otherwise specified. The invention is illustrated by, but not restricted to, the following preferred embodiments:

EXAMPLE I

*1-(2-vinylphenoxy)-2,3-propanediol*

One hundred parts of 1-(2-vinylphenoxy)-2,3-epoxypropane, obtained from 2-vinyl phenol and epichlorohydrin by the procedure described in Example I of my copending application, Serial No. 463,608, filed concurrently herewith, is boiled in dilute aqueous caustic for one hour. The mixture is cooled and acidified with hydrochloric acid. The mixture is extracted with five equal volume portions of ether, the portions combined, and the ether removed by evaporation. The compound is recrystallized from benzene. There is obtained a white solid melting at 91–92° C. which is characterized by analyses for carbon and hydrogen which are in substantial agreement with the theoretical values, by analytical hydrogenation which indicates 1.1 double bonds and by the paranitrobenzoate derivative of the hydrogenated product which has a melting point of 125–126° C.

EXAMPLE II

*1-(4-isopropenylphenoxy)-2,3-propanediol*

One hundred parts 1-(4-isopropenylphenoxy)-2,3-epoxypropane, obtained from 4-isopropenyl phenol and epichlorohydrin by the procedure described in Example II of my copending application, Serial No. 463,608, filed concurrently herewith, is treated according to the procedure of Example I above. There is obtained the desired product which, upon crystallizations from benzene, yields white plates melting at 111.5° C. The product is characterized by carbon and hydrogen analyses which are in substantial agreement with the theoretical values, by analytical hydrogenation which shows 1.05 double bonds, and by the bis-paranitrobenzoate derivative of the hydrogenated product which melts at 96–96.5° C.

EXAMPLE III

*1-(3-vinylphenoxy)-2,3-propanediol*

1-(3-vinylphenoxy)-2,3-epoxypropane, obtained from 3-vinyl phenol and epichlorohydrin by the process described in my copending application, Serial No. 463,608, filed concurrently herewith, is treated according to the procedure of Example I. There is obtained the desired compound which is characterized by carbon and hydrogen analysis and by analytical hydrogenation which give values in substantial agreement with the theoretical values.

EXAMPLE IV

*1-(2-vinylphenoxy)-3,4-butanediol*

1-(2-vinylphenoxy)-3,4-epoxybutane, obtained from 2-vinyl phenol and 1-chloro-3,4-epoxybutane by the procedure described in my presently copending application, Serial No. 463,608, filed concurrently herewith, is treated according to the procedure of Example I. There is obtained the desired compound which is characterized by carbon and hydrogen analyses and by analytical hydrogenation which give values in substantial agreement with the theoretical values.

EXAMPLE V

*1-(4-isopropenylphenoxy)-3,4-butanediol*

One hundred parts 1-(4-isopropenylphenoxy)-3,4-epoxybutane, obtained from 4-isopropenyl phenol and 1-chloro-3,4-epoxybutane by the procedure described in my presently copending application, Serial No. 463,608, filed concurrently herewith, is treated according to the procedure of Example I. There is obtained the desired compound which is characterized by carbon and hydrogen analyses and by analytical hydrogenation which give values in substantial agreement with the theoretical values.

It will be realized that the various dihydroxyalkyl alkenylaryl ethers of this invention can be obtained by the hydrolysis of the corresponding epoxyalkyl alkenylaryl ethers described in my above-mentioned application. Additionally, it is to be noted that the dihydroxy compounds of this invention are produced in minor quantities in the preparation of the corresponding epoxyalkyl alkenylaryl ethers by the reaction of an alkenylaryloxy salt with an epihalohydrin as described in my above-mentioned application. These dihydroxy compounds are characterized by analyses for carbon and hydrogen and analytical hydrogenation.

EXAMPLE VI

One hundred parts 1-(2-vinylphenoxy)-2,3-propanediol obtained as in Example I are admixed with one-half part benzoyl peroxide. The atmosphere is alternately purged with nitrogen and evacuated to approximately 0.5 mm. mercury. The compound is then heated at 80–105° C. for approximately 2 days. There is obtained polymeric 1-(2-vinyl)-2,3-propanediol, which is a linear, soluble polymer.

Similarly, linear, soluble polymers of 1-(3-vinylphenoxy)-2,3-propanediol (obtained as in Example III), 1-(2-vinylphenoxy)-3,4-butanediol (obtained as in Example IV) and of the other dihydroxyalkyl alkenylaryl ethers of this invention are obtained by following the foregoing procedure. For the benzoyl peroxide utilized therein, there can be substituted a variety of peroxy catalysts such as hydrogen, acetyl, acetyl-benzoyl, phthalyl and lauroyl peroxides, tertiary-butyl hydroperoxides, etc., and other percompounds; for example ammonium persulfate, sodium persulfate, sodium perchlorate and the like.

EXAMPLE VII

One hundred parts 1-(4-isopropenylphenoxy)-2,3-propanediol is polymerized according to the procedure of Example VI. There is obtained linear, soluble polymeric 1-(4-isopropenylphenoxy)-2,3-propanediol.

Similarly, the various dihydroxyalkyl isopropenylaryl ethers of this invention, for example, 1-(4-isopropenylphenoxy)-3,4-butanediol, (obtained as in Example V), can be polymerized according to the procedure of Example V to yield linear, soluble homopolymers.

EXAMPLE VIII

Ninety parts styrene, 10 parts 1-(2-vinylphenoxy)-2,3-propanediol and one-half part benzoyl peroxide are admixed in a reaction vessel and the atmosphere swept out and filled with nitrogen. The polymerizable mass is heated at 80–105° C. for approximately 2 days. There is obtained a soluble, linear copolymer.

EXAMPLE IX

Example VIII is repeated substituting for the vinylphenoxy diol there utilized an equal weight of 1-(4-isopropenylphenoxy)-2,3-propanediol (obtained as in Example II). There is obtained a light yellow, linear, soluble copolymer.

EXAMPLE X

Example VIII is repeated substituting for the reactants there used 50 parts 1-(2-vinylphenoxy)-2,3-propanediol, 50 parts maleic anhydride and 1 part benzoyl peroxide dissolved in 500 parts xylene. At the end of the heating the xylene is removed by vacuum distillation. There is obtained a linear, soluble copolymer.

EXAMPLE XI

Example X is repeated substituting for the 1-(2-vinylphenoxy)-2,3-propanediol there used an equal quantity of 1-(4-isopropenylphenoxy)-2,3-propanediol. There is obtained a soluble, linear copolymer.

EXAMPLE XII

Example VIII is repeated substituting for the styrene there used, an equal weight of acrylonitrile. There is obtained a linear, soluble copolymer.

EXAMPLE XIII

Example IX is repeated utilizing in place of the styrene there utilized, an equal weight of acrylonitrile. There is obtained a linear, soluble copolymer.

EXAMPLE XIV

Example VIII is repeated substituting for the styrene there utilized, an equal weight of butadiene. There is obtained a linear, soluble copolymer.

EXAMPLE XV

Example IX is repeated substituting for the styrene there used, an equal weight of butadiene. There is obtained a linear, soluble copolymer.

EXAMPLE XVI

Example VIII is repeated substituting for the styrene there utilized, an equal weight of methyl methacrylate. There is obtained a linear, soluble copolymer.

EXAMPLE XVII

Example IX is repeated substituting for the styrene there utilized, an equal weight of methyl methacrylate. There is obtained a linear, soluble copolymer.

Examples VIII–XVII inclusive illustrate the preparation of copolymers of the various compounds of this invention and copolymerizable ethylenic monomers.

It is to be realized that any of the various dihydroxyalkyl alkenylaryl ethers of this invention can be substituted for the particular compound of the invention utilized in the immediately foregoing illustrations of copolymerization to yield copolymers. Furthermore, there can be utilized mixtures of two or more of the compounds of this invention in the preparation of copolymers either of the compounds of this invention alone or in combination with a copolymerizable ethylenically unsaturated monomer, or mixtures of two or more such copolymerizable ethylenically unsaturated monomers.

As noted above, in connection with the homopolymerization of the compounds of this invention various "per" compounds can be used as catalysts in preparation of the above-described copolymers.

EXAMPLE XVIII

One hundred parts of the polymer of Example VI are admixed with 4 parts 2,4-toluenediisocyanate and the mixture heated for one hour at 75° C. There is obtained an insoluble, infusible, cross-linked polymer.

There can be substituted for the polymer of Example VI any of the various polymers of the compounds of this invention such as, for example, the polymers of Examples VII through XVII inclusive. There are obtained insoluble, infusible, cross-linked copolymers. Additionally, there can be substituted for the 2,4-toluene diisocyanate, other diisocyanates such as phenylenediisocyanate, 2,6-toluenediisocyanate, 1,5 - naphthalenediisocyanate, 1-chloro-1-phenylene-2,4-diisocyanate, 4,4' - xenylenediisocyanate, methylene bis-(4-phenylisocyanate), hexamethylenediisocyanate, tetramethylenediisocyanate and the like. The amount of these diisocyanates utilized is governed by the degree of cross-linking desired.

EXAMPLE XIX

One hundred parts of the polymer of Example VII is admixed with 10 parts of the diglycidyl ether of bisphenol and 1 part ethylene diamine, and the mixture heated to approximately 75° C. There is obtained a thermoset resin.

EXAMPLE XX

Example XIX is repeated utilizing in place of the diglycidyl ether of bisphenol an equal weight of the resin described at column 7 of my U. S. Patent 2,658,885, granted Nov. 10, 1953. There is obtained a thermoset resin. It will be realized that the various epoxyalkoxy hydrocarbon-substituted-phenol aldehyde resins described in that patent can be utilized in the foregoing procedure. Additionally the epoxyalkoxy chlorine-substituted-phenol aldehyde resins described in my U. S. Patent 2,658,884, granted Nov. 10, 1953, can be utilized in the foregoing procedure.

It is to be noted that in place of ethylene diamine catalyst utilized in Example XIX there can be substituted equivalent portions of such amine catalysts as tetrahydroquinoline and piperidine to obtain substantially similar results.

EXAMPLE XXI

One hundred parts of the polymer of Example VIII is heated with 100 parts of linseed fatty acids in a closed stainless steel kettle equipped with an agitator, a means for introducing an inert gas below the surface of the liquid contents and a gas outlet means. The mixture is heated to approximately 175° C. and agitated while nitrogen is passed through the reaction mass to carry off the water produced by the esterification reaction.

There is obtained a modified polymer having greater oil-solubility than the original polymer, said modified polymer being particularly useful in the preparation of paints and varnishes. It will be realized that for the linseed fatty acids utilized above, there can be substituted a variety of drying oil and semi-drying oil fatty acid compositions. Such fatty acids are those derived from linseed, dehydrated castor, tung, perilla, soybean, oiticia, fish, hempseed, poppy seed, sunflower oils, etc. Further, the various linear, soluble polymers and copolymers of the monomers of this invention can be esterified according to the foregoing procedure to yield products of increased oil solubility and of utility in the preparation of paints and varnishes.

In those instances in which the hydroxyalkyl alkenylaryl ethers are copolymerized with ethylenically unsaturated monomers which do not possess other potentially reactive groups it is desirable that at least one percent of the dihydroxyalkyl alkenaryl ethers be included in the polymer molecule for cross-linking purposes such as, for example, by reaction with polyisocyanate or polyoxirane compounds as heretofore described.

It will be realized that the dihydroxy compounds, of this invention, upon esterification, yield products possessing greater oil solubility than do the esterified monhydroxy compounds, as a result of which they possess a wider range of utility in the preparation of paints, varnishes, and the like.

It will be realized that the hydrophilic properties of the monomers and polymers of this invention can be increased by reaction by the introduction of a plurality of hydroxyalkylene groups into the molecule such as, for example, by the reaction of an alkylene oxide such as ethylene or propylene oxide with a hydroxyl group of the monomers or polymers of this invention. In particular, the epoxyalkyl alkenylaryl ethers described and claimed in my copending application filed concurrently herewith, can be reacted with the monomers and polymers of this invention to produce desirable modifications thereof.

While the invention has been described with reference to particular embodiments thereof, it will be understood that in its broadest aspects the invention may be variously embodied within the scope of the invention as set forth herein and in the appended claims.

What is claimed is:

1. A dihydroxyalkyl alkenylaryl ether of the formula $$CH_2=CR-Ar-O-C_nH_{2n-1}(OH)_2$$

in which Ar is an arylene radical, R is chosen from the class consisting of hydrogen and methyl, $n$ is an integer having a value of at least 3 and no greater than 8 and in which the hydroxyl groups are substituted on adjacent carbon atoms.

2. 1-(4-vinylphenoxy)-2,3-propanediol.
3. 1-(2-vinylphenoxy)-2,3-propanediol.
4. 1-(4-isopropenylphenoxy)-2,3-propanediol.
5. 1-(3-isopropenylphenoxy)-2,3-propanediol.
6. 1-(3-vinylphenoxy)-2,3-propanediol.
7. A homopolymer of a dihydroxyalkyl alkenylaryl ether of claim 1.
8. A polymer of a dihydroxyalkyl alkenylaryl ether having a plurality of repeating units of the formula

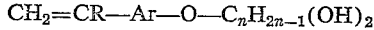

in which the hydroxyl groups are substituted on adjacent carbon atoms.

9. A copolymer of a dihydroxyalkyl alkenylaryl ether of claim 1 and at least one other copolymerizable ethylenically unsaturated monomer.

10. A copolymer of 1-(2-vinylphenoxy)-2,3-propanediol and at least one other copolymerizable ethylenically unsaturated monomer.

11. A copolymer of claim 9 in which the copolymerizable ethylenically unsaturated monomer comprises styrene.

12. A copolymer of claim 9 in which the copolymerizable ethylenically unsaturated monomer comprises butadiene.

13. A copolymer of claim 9 in which the copolymerizable ethylenically unsaturated monomer comprises acrylonitrile.

14. A copolymer of claim 9 in which the copolymerizable ethylenically unsaturated monomer comprises maleic anhydride.

15. A copolymer of claim 9 in which the copolymerizable ethylenically unsaturated monomer comprises methyl methacrylate.

16. An insoluble polymer of a dihydroxyalkyl alkenylaryl ether of claim 2 and, at least one other polymerizable ethylenic monomer, said polymer containing a plurality of cross-linkages derived from hydroxy groups of said dihydroxyalkyl groups.

17. An insoluble polymer comprising 1-(2-vinylphenoxy)-2,3-propanediol and at least one other polymerizable ethylenic monomer, said polymer containing a plurality of cross-linkages derived from hydroxy groups of said dihydroxyalkyl groups.

18. An insoluble polymer of claim 16 in which the copolymerizable ethyleneic monomer comprises styrene.

19. An insoluble polymer of claim 16 in which the copolymerizable ethylenic monomer comprises butadiene.

20. An insoluble polymer of claim 16 in which the copolymerizable ethylenic monomer comprises acrylonitrile.

21. An insoluble polymer of claim 16 in which the copolymerizable ethylenic monomer comprises maleic anhydride.

22. An insoluble polymer of claim 16 in which the copolymerizable ethylenic monomer comprises methyl methacrylate.

23. A copolymer of 1-(4-vinylphenoxy)-2,3-propanediol and at least one other copolymerizable ethylenically unsaturated monomer.

24. A copolymer of 1-(4-isopropenylphenoxy)-2,3-propanediol and at least one other copolymerizable ethylenically unsaturated monomer.

25. A copolymer of 1-(3-isopropenylphenoxy)-2,3-propanediol and at least one other copolymerizable ethylenically unsaturated monomer.

26. A copolymer of 1-(3-vinylphenoxy)-2,3-propanediol and at least one other copolymerizable ethylenic unsaturated monomer.

27. An insoluble polymer comprising 1-(4-vinylphenoxy)-2,3-propanediol and at least one other polymerizable ethylenic monomer, said polymer containing a plurality of cross-linkages derived from hydroxy groups of said dihydroxalkyl groups.

28. An insoluble polymer comprising 1-(4-isopropenylphenoxy)-2,3-propanediol and at least one other polymerizable ethylenic monomer, said polymer containing a plurality of cross-linkages derived from hydroxy groups of said dihydroxyalkyl groups.

29. An insoluble polymer comprising 1-(3-isopropenylphenoxy)-2,3-propanediol and at least one other polymerizable ethylenic monomer, said polymer containing a plurality of cross-linkages derived from hydroxy groups of said dihydroxyalkyl groups.

30. An insoluble polymer comprising 1-(3-vinylphenoxy)-2,3-propanediol and at least one other polymerizable ethylenic monomer, said polymer containing a plurality of cross-linkages derived from hydroxy groups of said dihydroxyalkyl groups.

References Cited in the file of this patent

UNITED STATES PATENTS

| 599,123 | Endemann | Feb. 15, 1898 |

FOREIGN PATENTS

| 625,493 | Great Britain | June 29, 1949 |
| 651,334 | Great Britain | Mar. 14, 1951 |